United States Patent
Sugimoto

(10) Patent No.: US 10,193,316 B2
(45) Date of Patent: Jan. 29, 2019

(54) CORRUGATED TUBE AND WIRE HARNESS

(71) Applicant: YAZAKI CORPORATION, Tokyo (JP)

(72) Inventor: Masahisa Sugimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/641,026

(22) Filed: Jul. 3, 2017

(65) Prior Publication Data

US 2018/0076606 A1 Mar. 15, 2018

(30) Foreign Application Priority Data

Sep. 12, 2016 (JP) ................. 2016-177374

(51) Int. Cl.
*H02G 3/04* (2006.01)
*F16L 11/15* (2006.01)
*H01B 7/00* (2006.01)
*H02G 11/00* (2006.01)

(52) U.S. Cl.
CPC ............ *H02G 3/0468* (2013.01); *F16L 11/15* (2013.01); *H01B 7/0045* (2013.01); *H02G 11/006* (2013.01)

(58) Field of Classification Search
CPC ...... H02G 3/0468; F16L 11/15; H01B 7/0045
USPC .......................................... 138/122; 174/68.3
See application file for complete search history.

(56) References Cited

U.S. PATENT DOCUMENTS 5,564,472 A * 10/1996 Gipperich ............. F16L 9/06
138/121
5,573,038 A * 11/1996 Kanao ....................... F16L 9/16
138/122
7,253,361 B2 * 8/2007 Nishijima ............ H02G 3/0468
138/121
2007/0044989 A1 3/2007 Nishijima et al.
2009/0000682 A1 1/2009 Kisu et al.
2014/0196929 A1 7/2014 Okuhara
2016/0148721 A1 5/2016 Tsukamoto et al.
2016/0218496 A1 7/2016 Terada et al.

(Continued)

FOREIGN PATENT DOCUMENTS

| CN | 103782460 A | 5/2014 |
| CN | 204144841 U | 2/2015 |
| CN | 105818760 A | 8/2016 |

(Continued)

OTHER PUBLICATIONS

Chinese Office Action for the related Chinese Patent Application No. 201710811104.4 dated Oct. 31, 2018.

*Primary Examiner* — Dhiru R Patel

(74) *Attorney, Agent, or Firm* — Kenealy Vaidya LLP

(57) ABSTRACT

A corrugated tube has a tubular shape and is configured such that a conductor path is inserted into an inside thereof. The corrugated tube includes a bellow portion and a rib. The bellow portion has recessed grooves and projecting stripes which are alternately arrayed in a longitudinal direction of the tubular shape and extend in a circumferential direction of the tubular shape. The rib is formed in a portion of the bellow portion in the longitudinal direction and extends in the longitudinal direction. At least one of corners of a sectional shape of the rib viewed from the longitudinal direction is a curved portion having a predetermined curvature radius.

9 Claims, 8 Drawing Sheets

(56) References Cited

U.S. PATENT DOCUMENTS

2017/0072878 A1    3/2017  Mochizuki et al.

FOREIGN PATENT DOCUMENTS

| | | |
|---|---|---|
| JP | 2006-223087 A | 8/2006 |
| JP | 2007-60754 A | 3/2007 |
| JP | 2007-181267 A | 7/2007 |
| JP | 2009-11136 A | 1/2009 |
| JP | 2010-74974 A | 4/2010 |
| JP | 1588516 B2 | 12/2010 |
| JP | 2012-182964 A | 9/2012 |
| JP | 2013-162716 A | 8/2013 |
| JP | 2014-173694 A | 9/2014 |
| JP | 2015-47015 A | 3/2015 |
| JP | 2015-228759 A | 12/2015 |

* cited by examiner

CORRUGATED TUBE AND WIRE HARNESS

CROSS REFERENCE TO RELATED APPLICATIONS

This application is based on Japanese Patent Application (No. 2016-177374) filed on Sep. 12, 2016, the contents of which are incorporated herein by way of reference.

BACKGROUND

The present invention relates to a corrugated tube and a wire harness.

In the related art, a corrugated tube is known. The corrugated tube has a bellow portion which is formed in a tubular shape, and in which a recessed groove and a projecting stripe are alternately arrayed so as to extend in a circumferential direction of a tube. A conductor path is inserted into the tube side. For example, this corrugated tube is used for a slide door of a vehicle in a state where a wire (example of the conductor path) is inserted into the tube side. The corrugated tube is formed of a synthetic resin, and has a role to safely protect the wire inserted into the tube side from external interference (for example, refer to Patent Documents 1 to 10). The corrugated tube configures a wire harness by inserting the wire into the tube side.

[Patent Document 1] JP 2013-162716 A
[Patent Document 2] JP 2015-228759 A
[Patent Document 3] JP 2014-173694 A
[Patent Document 4] JP 2006-223087 A
[Patent Document 5] JP 2012-182964 A
[Patent Document 6] JP 2010-74974 A
[Patent Document 7] JP 2015-47015 A
[Patent Document 8] JP 2009-11136 A
[Patent Document 9] JP 2007-181267 A
[Patent Document 10] JP 2007-60754 A

SUMMARY

An object of the invention is to provide a corrugated tube and a wire harness which can further improve a regulating force in a rib-formed location.

According to one advantageous effect of the present invention, there is provided a corrugated tube, which has a tubular shape and is configured such that a conductor path is inserted into an inside thereof, the corrugated tube including:

a bellow portion having recessed grooves and projecting stripes which are alternately arrayed in a longitudinal direction of the tubular shape and extend in a circumferential direction of the tubular shape; and a rib formed in a portion of the bellow portion in the longitudinal direction and extending in the longitudinal direction, wherein at least one of corners of a sectional shape of the rib viewed from the longitudinal direction is a curved portion having a predetermined curvature radius.

Two sidewalls of the rib may be inclined so that a width of the rib in the circumferential direction at an outer distal position of the rib in a radial direction of the tubular shape is smaller than the width at an inner base position of the rib in the radial direction.

A height of the rib from the recessed groove in a radial direction of the tubular shape may be changed in the longitudinal direction.

A width of the rib in the circumferential direction may be changed in the longitudinal direction.

The width of the rib may be continuously changed in the longitudinal direction.

The rib may be disposed between an end part of the corrugated tube and a location away from the end part with a predetermined distance, and the width at the end part may be wider than the width at the location away from the end part with the predetermined distance.

The rib may have a top surface and two sidewalls connecting the top surface and a bottom surface of each of the recessed grooves. Each of two corners of the sectional shape between the top surface and the two sidewalls may be the curved portion. Each of two corners of the sectional shape between the two sidewalls and the bottom surface may be the curved portion.

According to another one advantageous effect of the present invention, there is provided a wire harness including:

the corrugated tube; and a conductor path inserted into the corrugated tube.

BRIEF DESCRIPTION OF DRAWINGS

FIG. 4A illustrates a cross section taken by line A-A, FIG. 4B illustrates a cross section taken by line B-B, and FIG. 4C illustrates a cross section taken by line C-C.

DETAILED DESCRIPTION OF EXEMPLIFIED EMBODIMENTS

The corrugated tube used for a movable unit such as the slide door can be flexibly bent by the bellow portion. However, the corrugated tube partially has a location which needs to regulate a route (location which does not need to be excessively bent). Patent Document 1 proposes a technique in which a route regulating component is provided for the location which needs to regulate the route of the corrugated tube.

However, according to the technique disclosed in Patent Document 1, the corrugated tube is pressed against the route regulating component with a strong force or vehicle vibration is applied to the corrugated tube in a state where the corrugated tube is in contact with the route regulating component, thereby causing a possibility that the corrugated tube may be damaged or cracked.

Therefore, as disclosed in Patent Documents 2 to 10, a corrugated tube is proposed in which a bending regulating force is improved by providing a rib continuously extending in a tube longitudinal direction DL. According to this corrugated tube, the rib is formed so as to correspond to the location which does not need to be excessively bent. In this manner, excessive bending can be prevented by improving the bending regulating force of the location.

Here, the present inventors found that in some cases, the corrugated tube still has an insufficient regulating force even in the rib-formed location.

The present invention is made in order to solve this problem, and an object thereof is to provide a corrugated tube and a wire harness which can further improve a regulating force in a rib-formed location.

Hereinafter, the present invention will be described with reference to preferred embodiments, Without being limited to the embodiments described below, the present invention can be appropriately modified within the scope not departing from the gist of the present invention. The embodiments described below may omit illustration or description of a partial configuration. However, as a matter of course, a publicly known or well-known technique is appropriately applied to details of the omitted technique within the scope which is not contradictory to the content described below.

Figure 1:
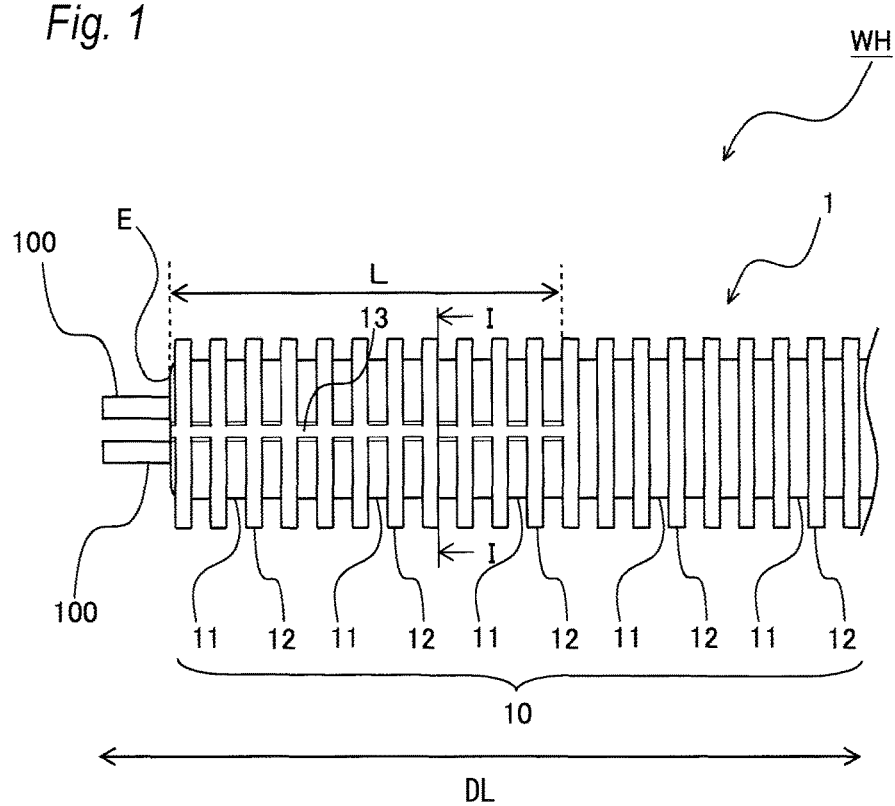
FIG. 1 is a side view illustrating a wire harness including a corrugated tube according to a first embodiment.

FIG. 1 is a side view illustrating a wire harness including a corrugated tube according to a first embodiment. A corrugated tube 1 illustrated in FIG. 1 is used for a vehicle, particularly for a slide door. However, the present invention is not limited thereto. FIG. 1 illustrates one end of the corrugated tube 1. The other end may adopt the same configuration as that of one end. However, in the present embodiment, description will be made on the assumption that both of these have mutually different configurations.

As illustrated in FIG. 1, the corrugated tube 1 according to the present embodiment is a component which is formed of a synthetic resin, which is formed in a tubular shape. A wire (example of a conductor path) 100 is inserted into an inside of the corrugate tube 1, As long as the corrugated tube 1 has the tubular shape, the corrugated tube 1 may be configured to have a circular shape particularly in a sectional view. The corrugated tube 1 may be configured to have an elliptical shape or an oblong shape. Alternatively, the corrugated tube 1 may be configured to have a polygonal shape. The corrugated tube 1 may include or may not include a notch extending in a tube longitudinal direction DL in order to introduce the wire 100. A configuration of a wire harness WH is provided in a state where the wire 100 is inserted into the corrugated tube 1.

This corrugated tube 1 has a bellow portion 10 in which recessed grooves 11 and projecting stripes 12 which extend in a tube circumferential direction DC are alternately arrayed in a tube longitudinal direction DL. The bellow portion 10 according to the present embodiment is formed from one end to the other end, that is, in an entire range of the corrugated tube 1. The corrugated tube 1 is likely to be bent by the bellow portion 10.

The corrugated tube 1 further includes a rib 10 which is disposed between a tube one end E and a location away from the tube one end E with a predetermined distance L (example of a portion in the longitudinal direction of the bellow portion 10). The rib 13 is a projecting stripe extending in the longitudinal direction DL of the corrugated tube 1. In the present embodiment, a height of the rib 13 is the same as a height of the projecting stripe 12. Since the rib 13 is provided, a bending regulating force is achieved. The rib 13 may be formed on only a surface side (illustrated side in FIG. 1) of the corrugated tube 1, or may be formed on both surface side and rear side. As long as the rib 13 substantially extends in the tube longitudinal direction DL, the rib 13 may not extend parallel to a tube longitudinal direction DL. The rib 13 may extend in a direction in which the rib 13 is inclined with respect to a tube axis.

Figure 2:
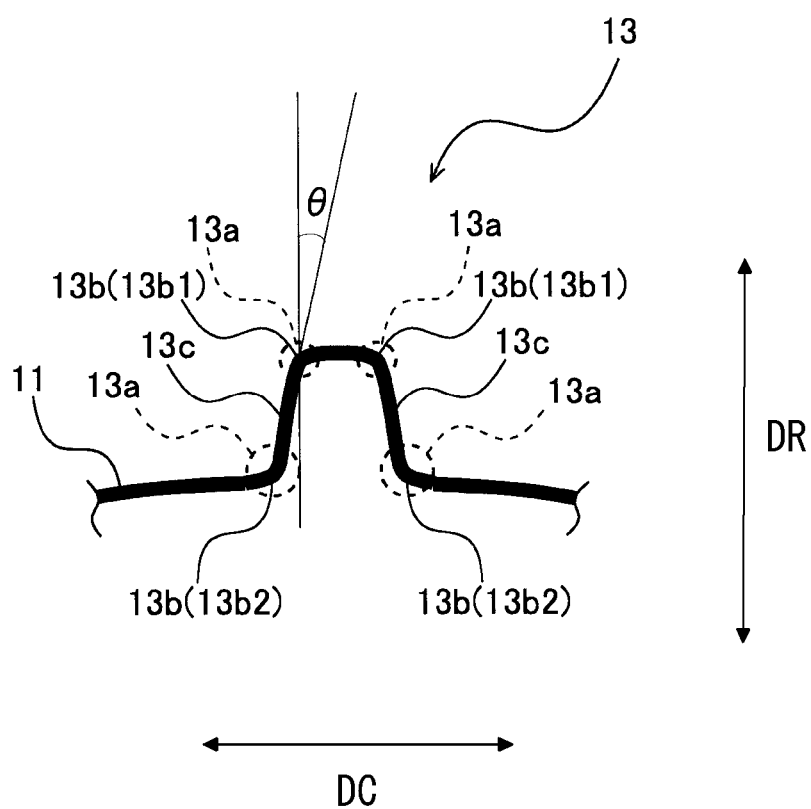
FIG. 2 is a partial sectional view of the corrugated tube illustrated in FIG. 1, and illustrates a cross section taken by line I-I.

FIG. 2 is a partial sectional view of the corrugated tube illustrated in FIG. 1, and illustrates a cross section taken by line I-I. Furthermore, in a sectional view viewed from the longitudinal direction DL of the corrugated tube 1, the rib 13 of the corrugated tube 1 according to the present embodiment has a deformed rectangular shape in which four corners 13a have a curved portion 13b with a predetermined curvature radius. The rib 13 has a top surface and two sidewalls 13c connecting the top surface and a bottom surface of each of the recessed grooves 11. Each of two corners 13a of the sectional shape between the top surface and the two sidewalls 13c is the curved portion 13b1. Each of two corners 13a of the sectional shape between the two sidewalls 13c and the bottom surface is the curved portion 13b2.

In addition, both sidewalls 13c of the rib 13 are inclined so that distal sides come close to each other. The two sidewalls 13c of the rib 13 are inclined so that a width of the rib 13 in a circumferential direction DC of the tubular shape at an outer distal position of the rib 13 in a radial direction DR of the tubular shape is smaller than the width at an inner base position of the rib 13 in the radial direction DR.

This corrugated tube 1 can further improve the regulating force in a formed location of the rib 13. That is, since the bend 13b is formed therein, the regulating force can be improved. Since both sidewalls 13c are inclined so that the distal sides come close to each other, the regulating force can be improved. As the curvature radius of the bend 13b increases, the regulating force is improved. If an inclination angle θ of both sidewalls 13c is 30° or smaller, it is expected that the regulating force is improved to a certain degree.

In particular, in the first embodiment, it is preferable that an upper bend 13b1 of the rib 13 has a curvature radius R which satisfies R=0.2 (mm) or greater from a viewpoint of easy manufacturing. It is preferable that a lower bend 13b2 of the rib 13 has a curvature radius which is 1.2 to 2.0 times the curvature radius R of the upper bend 13b1 (more preferably, approximately 1.5 times). Furthermore, it is preferable that the inclination angle θ is 5° or greater from the viewpoint of easy manufacturing.

In this way, according to the corrugated tube 1 in the present embodiment, in a sectional view, the rib 13 has a substantially rectangular shape in which the four corners 13a have the bend 13b with the predetermined curvature radius. Accordingly, the regulating force can be improved by the bend 13b. Therefore, the regulating force can be further improved in the formed location of the rib 13.

Both sidewalls 13c of the rib 13 are inclined so that the distal sides come close to each other. Accordingly, the regulating force can be improved by the inclination of both sidewalls 13c. Therefore, the inclination can contribute to a configuration in which the more sufficient regulating force is achieved.

In addition, according to the wire harness WH in the present embodiment, it is possible to provide the wire harness which further improves the regulating force.

Next, a second embodiment according to the present invention will be described. A corrugated tube and a wire harness according to the second embodiment are the same as those according to the first embodiment. However, the second embodiment adopts a partially different configuration. Hereinafter, points different from those according to the first embodiment will be described.

Figure 3:
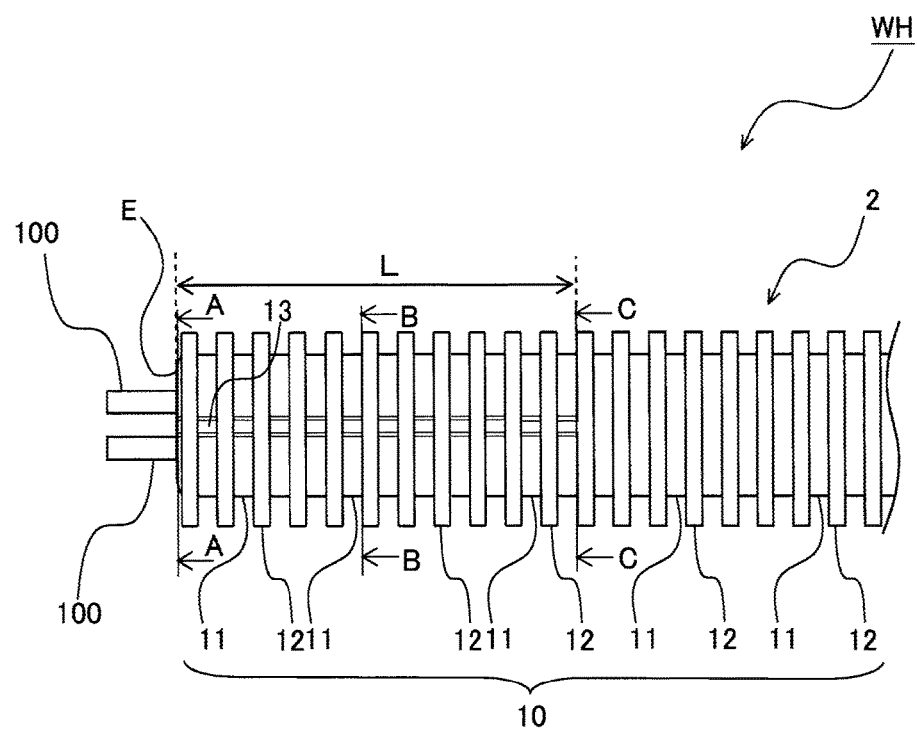
FIG. 3 is a side view illustrating a wire harness including a corrugated tube according to a second embodiment.
Figure 4A:
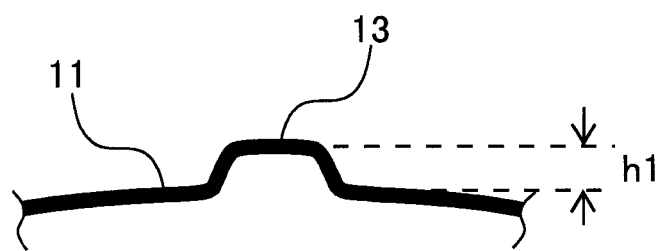
FIGS. 4A to 4C are partial sectional views of the corrugated tube illustrated in FIG. 3.
Figure 4B:
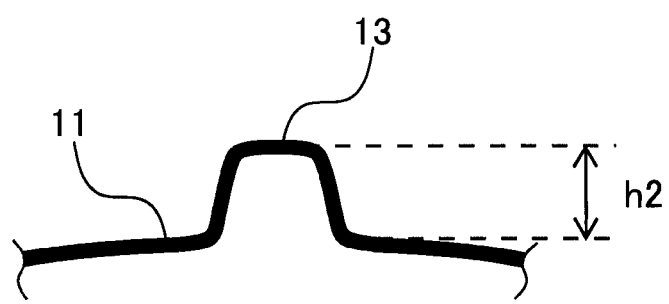
Figure 4C:
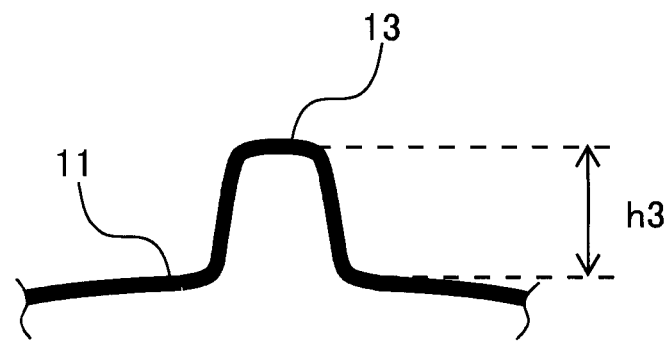

FIG. 3 is a side view illustrating a wire harness including a corrugated tube according to the second embodiment. FIG. 4 is a partial sectional view of the corrugated tube illustrated in FIG. 3. FIG. 4A illustrates a cross section taken by line A-A, FIG. 4B illustrates a cross section taken by line B-B, and FIG. 4C illustrates a cross section taken by line C-C.

As illustrated in FIG. 3, in the second embodiment, the rib 13 has a structure in which a height from the recessed groove 11 is changed in the tube longitudinal direction DL. Specifically, as illustrated in FIGS. 4A to 4C, the height in the tube one end E is represented by h1 and the height in a location away from the tube one end E with a distance of approximately L/2 it is represented by h2 (>h1). The height in a location away from the tube one end E with a distance L is represented by h3 (>h2). That is, in the second embodiment, the height of the rib 13 gradually (continuously) becomes higher toward the tube center side. The height may be continuously changed, or may be changed in a stepwise manner.

According to this corrugated tube 2, the regulating force is changed by the height of the rib 13. That is, the regulating force increases in the order of the heights h1, h2, and h3. In this manner, it is possible to achieve various regulating forces.

Figure 5:
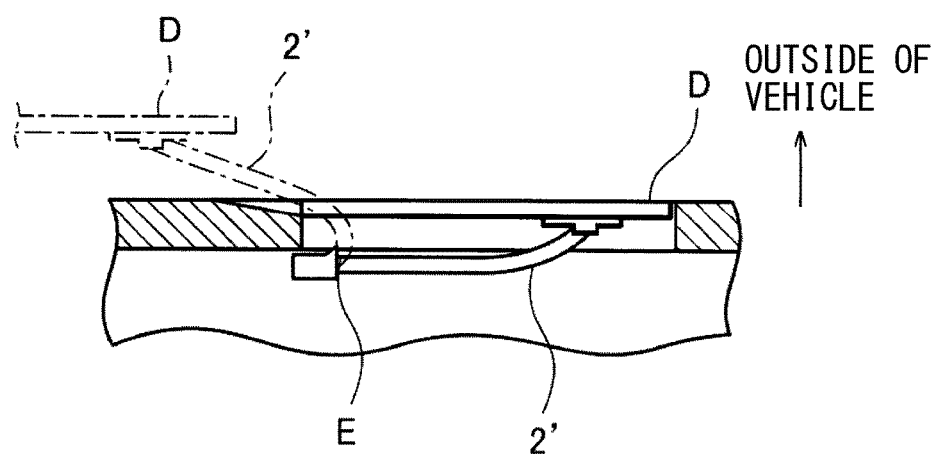
FIG. 5 is a view illustrating a bending state of a corrugated tube according to a first example in the related art when a slide door is opened and closed.

Next, a curved portioning state of the wire harness WH according to the second embodiment will be described. A bending state of a wire harness used in the related art will be described. FIG. 5 is a view illustrating a bending state of a corrugated tube according to a first example in the related art when a slide door is opened and closed. A solid line in FIG. 5 indicates a state when a slide door D is located at a closed position, and a one-dot chain line indicates a state when the slide door D is located at an opened position. In FIG. 5, the bellow portion is formed in the entire region, and a corrugated tube 2' having no rib formed thereon is used.

As illustrated in FIG. 5, in a case where the slide door D is located at the closed position, the corrugated tube 2' is in a substantially linearly extended state. Then, the slide door D is operated to be open, and moves to the opened position. In this case, the corrugated tube 2' is excessively bent on the tube one end E side opposite to the slide door D.

Figure 6:
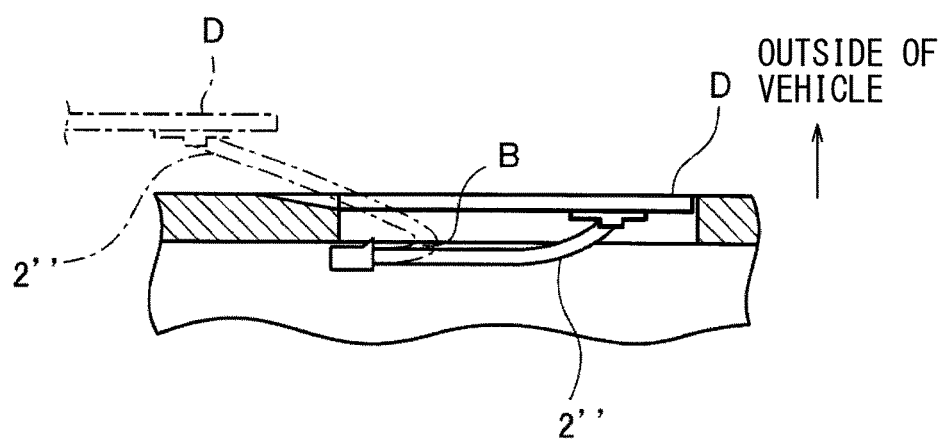
FIG. 6 is a view illustrating a bending state of a corrugated tube according to a second example in the related art when a slide door is opened and closed.

FIG. 6 is a view illustrating a bending state of a corrugated tube according to a second example in the related art when the slide door is opened and closed. A solid line in FIG. 6 indicates a state when the slide door D is located at the closed position, and a one-dot chain line indicates a state when the slide door D is located at the opened position. In FIG. 6, the bellow portion is formed in the entire region, and the rib is formed with a predetermined distance from the tube one end. A corrugated tube 2" is used in which the height of the rib is constant (for example, the height h1 illustrated in FIG. 4A is constant).

In a case where the slide door D is located at the closed position as illustrated in FIG. 6, similarly to the example illustrated in FIG. 5, the corrugated tube 2" is in a substantially linearly extended state. Then, the slide door D is operated to be open, and moves to the opened position. In this case, the corrugated tube 2" is bent in the boundary portion B between the location having the rib and the location having no rib so that the corrugated tube 2" is substantially folded (excessively bent).

Figure 7:
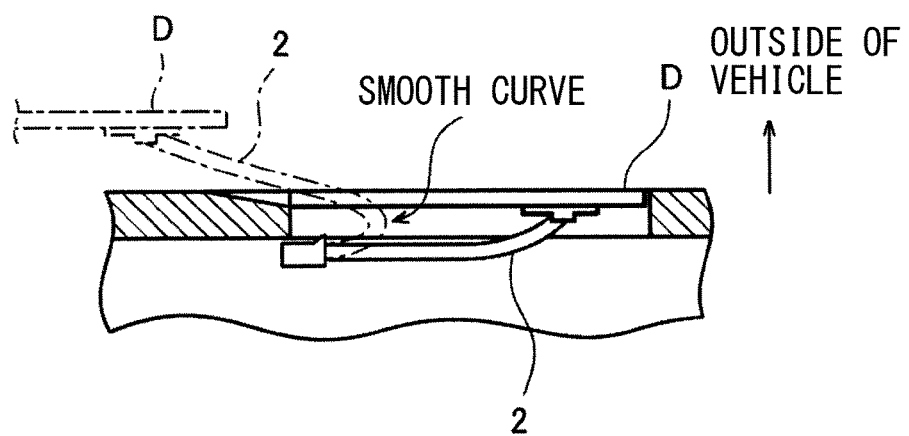
FIG. 7 is a view illustrating a bending state of a corrugated tube 2 according to the second embodiment when a slide door is opened and closed.

FIG. 7 is a view illustrating a bending state of a corrugated tube 2 according to the present embodiment when the slide door is opened and closed. A solid line in FIG. 7 indicates a state when the slide door D is located at the closed position, and a one-dot chain line indicates a state when the slide door D is located at the opened position.

In a case where the slide door D is located at the closed position as illustrated in FIG. 7, similarly to the example illustrated in FIG. 5, the corrugated tube 2 is in a substantially linearly extended state. Then, the slide door D is operated to be open, and moves to the opened position. Here, in the corrugated tube 2 according to the present embodiment, the height of the rib 13 is adjusted, thereby causing the regulating force to gradually decrease toward the center side in the tube one end E. Therefore, the bending corresponds to the regulating force. That is, as illustrated in FIG. 7, the tube one end E is hardly bent, and the corrugated tube 2 is gradually and increasingly bent toward the center side (smoothly and increasingly bent).

As a result, this configuration prevents the tube one end E of the corrugated tube 2' from being excessively bent as illustrated in FIG. 5 or prevents the boundary portion B of the corrugated tube 2" from being excessively bent as illustrated in FIG. 6.

In this way, according to the corrugated tube 2 and the wire harness WH in the second embodiment, similarly to the first embodiment, the regulating force can be further improved in the formed location of the rib 13. The rib 13 can contribute to a configuration in which the more sufficient regulating force is achieved. In addition, it is possible to provide the wire harness which further improves the regulating force.

Furthermore, according to the second embodiment, in the rib 13, the height from the recessed groove 11 in the radial direction (DR) is changed in the tube longitudinal direction DL. Accordingly, the regulating force for the bend is generated in accordance with the height of the rib 13. Therefore, it is possible to provide the corrugated tube 2 which can realize various regulating forces.

The height of the rib 13 in the radial direction (DR) is continuously changed in the tube longitudinal direction DL. Accordingly, the regulating force can be gradually changed in the tube longitudinal direction DL. Therefore, the gradual change can contribute to a configuration which restrains a sudden change in a curved portioning degree.

The rib 13 is disposed between the tube one end E and the location away from the tube one end E with the predetermined distance L. Accordingly, the regulating force of the corrugated tube 2 is improved in the vicinity of the location of the end portion of the wire 100 which is likely to be excessively bent. Therefore, it is possible to prevent the location from being excessively bent. Moreover, in the rib 13, the height h1 on the tube one end E is lower than the height h3 on the tube center side. Accordingly, the corrugated tube 2 is gradually and increasingly bent in the formed location of the rib 13 from the tube one end E side to the tube center side. Therefore, the gradual bending can contribute to a configuration which prevents sudden bending in the boundary portion B between the formed location of the rib 13 and the location having no rib 13 formed therein.

Next, a third embodiment according to the present invention will be described. A corrugated tube and a wire harness according to the third embodiment are the same as those according to the first embodiment. However, the third embodiment adopts a partially different configuration. Hereinafter, points different from those according to the first embodiment will be described.

Figure 8:
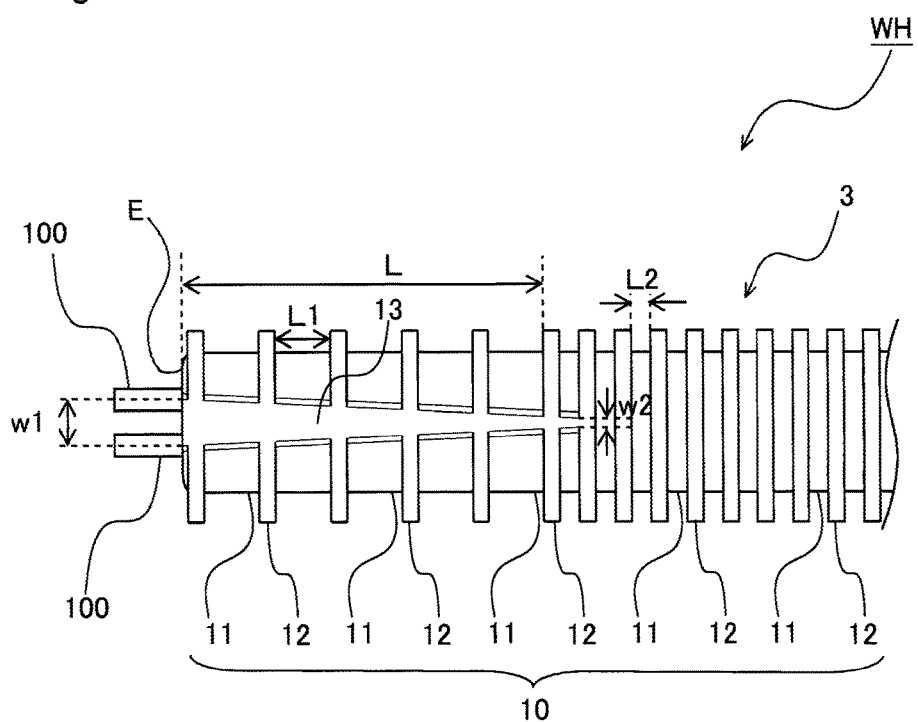
FIG. 8 is a side view illustrating a wire harness including a corrugated tube according to a third embodiment.

FIG. 8 is a side view illustrating a wire harness including a corrugated tube according to the third embodiment. As illustrated in FIG. 8, in the rib 13 according to the third embodiment, the width (length in the circumferential direction DC) is changed in the tube longitudinal direction DL. Specifically, in the rib 13, the width of the tube one end E is represented by w1, and is wider than w2 (<w1) of the tube center side. The width (w1) at the end part (E) is wider than the width at the location away from the end part (E) with the predetermined distance (L). The width of the rib 13 gradually (continuously) decreases toward the tube center side. The width of the rib 13 is not limited thereto. The width on the tube center side may increase. Alternatively, instead of being continuously changed, the width of the rib 13 may be changed in a stepwise manner.

In a corrugated tube 3, a longitudinal distance L1 of the recessed groove 11 in the formed location of the rib 13 is longer than a longitudinal distance L2 of the recessed groove in the location having no rib 13 formed therein.

In this corrugated tube 3, the regulating force is changed by the width of the rib 13. That is, as the width increases, the regulating force increases. In this manner, it is possible to achieve various regulating forces.

The bending state of the wire harness WH according to the third embodiment is the same as that according to the second embodiment.

In this way, according to the corrugated tube 3 and the wire harness WH in the third embodiment, similarly to the first embodiment, the regulating force can be further improved in the formed location of the rib 13. The rib 13 can contribute to a configuration in which the more sufficient regulating force is achieved. In addition, it is possible to provide the wire harness which further improves the regulating force.

Furthermore, according to the third embodiment, the width of the rib 13 is changed in the tube longitudinal direction DL. Accordingly, the regulating force for the bend is generated in accordance with the width. Therefore, it is possible to provide the corrugated tube 3 which can realize various regulating forces.

The width of the rib 13 is continuously changed in the tube longitudinal direction DL. Accordingly, the regulating force can be gradually changed in the tube longitudinal direction DL. Therefore, the gradual change can contribute to a configuration which restrains a sudden change in a curved portioning degree.

The rib 13 is disposed between the tube end E and the location away from the tube end E with the predetermined distance L. Accordingly, the regulating force of the corrugated tube 3 is improved in the vicinity of the location of the end portion of the wire 100 which is likely to be excessively bent. Therefore, it is possible to prevent the location from being excessively bent. Moreover, in the rib 13, the width w1 on the tube one end E is wider than the width w2 on the tube center side. Accordingly, the corrugated tube 3 is gradually and increasingly bent in the formed location of the rib 13 from the tube end side E to the tube center side. Therefore, the gradual bending can contribute to a configuration which prevents sudden bending in the boundary portion B between the formed location of the rib 13 and the location having no rib 13 formed therein.

Hitherto, the present invention has been described with reference to the embodiments. However, without being limited to the above-described embodiments, the present invention may be modified within the scope not departing from the gist of the present invention.

For example, in the above-described embodiments, the formed location of the rib 13 is not limited to the end of the corrugated tubes 1 to 3, and the rib 13 may be located on the center side. Without being limited to a case where the rib 13 is formed in one location, the rib 13 may be formed in two or more locations. Therefore, the rib 13 may be formed so as to be scattered from one end to the other end. Furthermore, with regard to the bending state of the corrugated tube 1 according to the first embodiment, a case where the corrugated tubes 2 and 3 according to the second and third embodiments are applied to the slide door D has been described as an example. However, without being limited thereto, the corrugated tubes 2 and 3 may be applied to other locations.

Furthermore, in the second embodiment, the height of the rib 13 may be lower on the tube center side. In the third embodiment, the width of the rib 13 may be wider on the tube center side. In addition, a change in the height or the width of the rib 13 may include various change forms such as a form in which the height or the width gradually decreases from one end to the other end of the corrugated tubes 2 and 3 and increases again after passing through the minimum value of the height or the width.

Furthermore, in the first embodiment, the four corners 13a of the rib 13 are formed to serve as the bend 13b with the predetermined curvature radius. However, without being limited to four, at least one of the corners 13a may be formed to serve as the bend 13b.

In view of the above, according to an aspect of the invention, there is provided the corrugated tube and the wire harness described as (i) to (ix) below.

(i) A corrugated tube (1, 2, 3), which has a tubular shape and is configured such that a conductor path (100) is inserted into an inside thereof, the corrugated tube (1, 2, 3) including:

a bellow portion (10) having recessed grooves (11) and projecting stripes (12) which are alternately arrayed in a longitudinal direction (DL) of the tubular shape and extend in a circumferential direction (DC) of the tubular shape; and a rib (13) formed in a portion of the bellow portion (10) in the longitudinal direction (DL) and extending in the longitudinal direction (DL), wherein at least one of corners (13a) of a sectional shape of the rib (13) viewed from the longitudinal direction (DL) is a curved portion (13b) having a predetermined curvature radius.

(ii) The corrugated tube (1, 2, 3) according to the (i) above, wherein two sidewalls (13c) of the rib (13) are inclined so that a width of the rib (13) in the circumferential direction (DC) at an outer distal position of the rib (13) in a radial direction (DR) of the tubular shape is smaller than the width at an inner base position of the rib (13) in the radial direction (DR).

(iii) The corrugated tube (1, 2, 3) according to the (i) above, wherein a height (h1, h2, h3) of the rib (13) from the recessed grooves (11) in a radial direction (DR) of the tubular shape is changed in the longitudinal direction (DL).

(iv) The corrugated tube (1, 2, 3) according to the (i) above, wherein a width of the rib (13) in the circumferential direction (DC) is changed in the longitudinal direction (DL).

(v) The corrugated tube (1, 2, 3) according to the (iv) above, wherein the width of the rib (13) is continuously changed in the longitudinal direction (DL).

(vi) The corrugated tube (1, 2, 3) according to the (iv) above, wherein the rib (13) is disposed between an end part (E) of the corrugated tube (1) and a location away from the end part (E) with a predetermined distance (L), and the width (w1) at the end part (E) is wider than the width at the location away from the end part (E) with the predetermined distance (L).

(vii) The corrugated tube (1, 2, 3), according to the (i) above, wherein the rib (13) has a top surface and two sidewalls (13c) connecting the top surface and a bottom surface of each of the recessed grooves (11), and each of two corners (13a) of the sectional shape between the top surface and the two sidewalls (13c) is the curved portion (13b1).

(viii) The corrugated tube (1, 2, 3), according to the (i) above, wherein the rib (13) has a top surface and two sidewalls (13c) connecting the top surface and a bottom surface of each of the recessed grooves (11), and each of two corners (13a) of the sectional shape between the two sidewalls (13c) and the bottom surface is the curved portion (13b2).

(ix) A wire harness (WH) including:

the corrugated tube (1, 2, 3) according to the (i) above; and a conductor path (100) inserted into the corrugated tube (1, 2, 3).

According to the corrugated tube of the present invention, the corrugated tube includes the rib that is formed in a portion in the longitudinal direction of the bellow portion. In a sectional view, the rib has the shape in which at least one corner has the bend with the predetermined curvature radius. Accordingly, a regulating force can be improved by the bend, and thus, the regulating force can be further improved in a rib-formed location.

According to the corrugated tube, both sidewalls of the rib are inclined so that the distal sides come close to each other. Accordingly, the regulating force can be improved by the inclination of both sidewalls. Therefore, the inclination can contribute to a configuration in which a more sufficient regulating force is achieved.

According to the corrugated tube, the height of the rib from the recessed groove is changed in the tube longitudinal direction. Accordingly, the regulating force for the bend is generated in accordance with the height of the rib. Therefore, it is possible to provide the corrugated tube which can realize various regulating forces.

According to the corrugated tube, the width of the rib is changed in the tube longitudinal direction. Accordingly, the regulating force for the bend is generated in accordance with the width of the rib. Therefore, it is possible to provide the corrugated tube which can realize various regulating forces.

According to the corrugated tube, the width of the rib is continuously changed in the tube longitudinal direction. Accordingly, the regulating force can also be gradually changed in the tube longitudinal direction. Therefore, the gradual change can contribute to a configuration which restrains a sudden change in a curved portioning degree.

According to the corrugated tube, the rib is disposed between the tube end and the location away from the tube end with the predetermined distance. Accordingly, the regulating force of the corrugated tube is improved in the vicinity of the location of an end portion of the conductor path which is likely to be excessively bent. Therefore, it is possible to prevent the location from being excessively bent. Moreover, the width on the tube end side is wider than the width on the tube center side. Accordingly, the corrugated tube is gradually and increasingly bent in the rib-formed location from the tube end side to the tube center side. Therefore, the gradual bending can contribute to a configuration which prevents sudden bending in a boundary portion between the rib-formed location and a location having no rib formed therein.

According to the wire harness of the present invention, it is possible to provide the wire harness which further improves the regulating force.

In view of the above, according to the present invention, it is possible to provide the corrugated tube and the wire harness which can further improve the regulating force in the rib-formed location.

What is claimed is:

1. A corrugated tube, which has a tubular shape and is configured such that a conductor path is inserted into an inside the tubular shape thereof, the corrugated tube comprising:

a bellow portion having recessed grooves and projecting stripes which are alternately arrayed in a longitudinal direction of the tubular shape and extend in a circumferential direction of the tubular shape; and a rib formed in a portion of the bellow portion in the longitudinal direction, extending in the longitudinal direction, wherein at least one of corners of a sectional shape of the rib viewed from the longitudinal direction is a curved portion having a predetermined curvature radius, and the rib intersects more than two of the projecting stripes.

2. The corrugated tube according to claim 1, wherein two sidewalls of the rib are inclined so that a width of the rib in the circumferential direction at an outer distal position of the rib in a radial direction of the tubular shape is smaller than the width at an inner base position of the rib in the radial direction.

3. The corrugated tube according to claim 1, wherein a height of the rib from the recessed grooves in a radial direction of the tubular shape is changed in the longitudinal direction.

4. The corrugated tube according to claim 1, wherein a width of the rib in the circumferential direction is changed in the longitudinal direction.

5. The corrugated tube according to claim 4, wherein the width of the rib is continuously changed in the longitudinal direction.

6. The corrugated tube according to claim 4, wherein the rib is disposed between an end part of the corrugated tube and a location away from the end part with a predetermined distance, and the width at the end part is wider than the width at the location away from the end part with the predetermined distance.

7. The corrugated tube, according to claim 1, wherein the rib has a top surface and two sidewalls connecting the top surface and a bottom surface of each of the recessed grooves, and each of two corners of the sectional shape between the top surface and the two sidewalls is the curved portion.

8. The corrugated tube, according to claim 1, wherein the rib has a top surface and two sidewalls connecting the top surface and a bottom surface of each of the recessed grooves, and each of two corners of the sectional shape between the two sidewalls and the bottom surface is the curved portion.

9. A wire harness comprising:

the corrugated tube according to claim 1; and a conductor path inserted into the corrugated tube.

* * * * *